Figure 1:
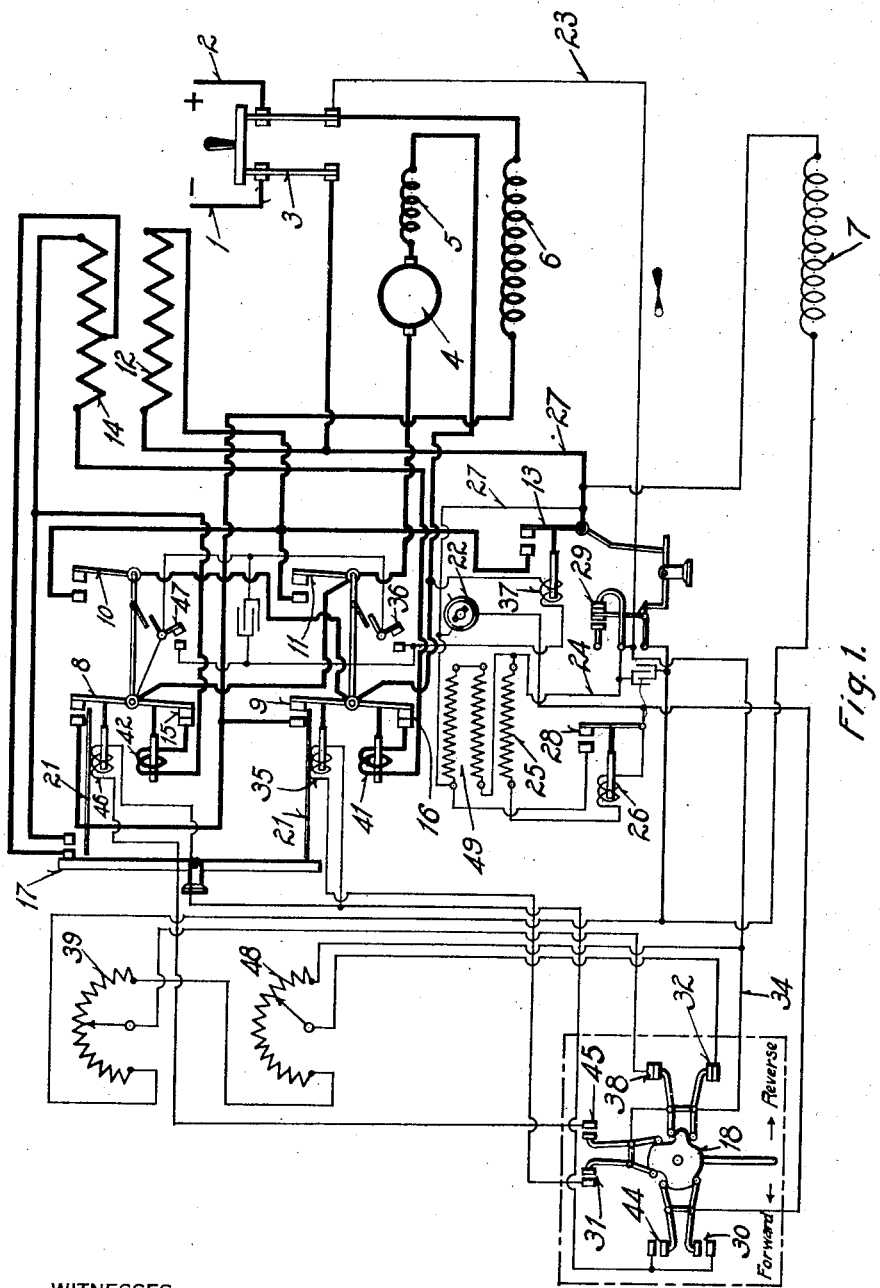

J. H. ALBRECHT AND W. O. LUM.
MOTOR CONTROL SYSTEM.
APPLICATION FILED MAY 14, 1915.

1,330,616.

Patented Feb. 10, 1920.
2 SHEETS—SHEET 1.

WITNESSES:
R. J. Fitzgerald
J. R. Langley.

INVENTOR
John H. Albrecht, and.
Walter O. Lum.
BY
Wesley G. Carr
ATTORNEY

J. H. ALBRECHT AND W. O. LUM.
MOTOR CONTROL SYSTEM.
APPLICATION FILED MAY 14, 1915.
1,330,616.
Patented Feb. 10, 1920.
2 SHEETS—SHEET 2.
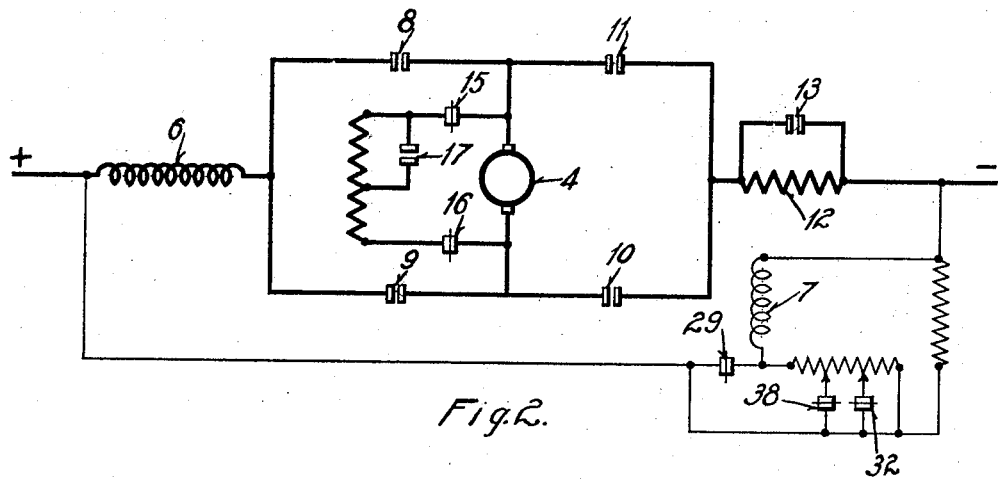
Fig.2.
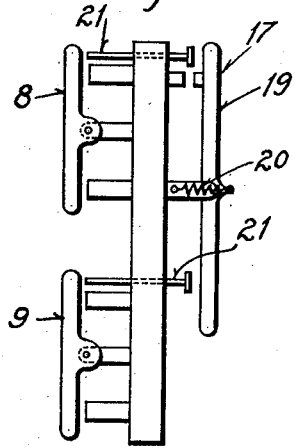
Sequence of Switches.
| Sw. | Cut. | Bk | Off. | Bk | Ret. |
|---|---|---|---|---|---|
| 8 |  |  |  | ⊙ | ⊙ |
| 9 | ⊙ | ⊙ |  |  |  |
| 10 |  |  |  | ⊙ | ⊙ |
| 11 | ⊙ | ⊙ |  |  |  |
| 13 | ⊙ |  |  |  | ⊙ |
| 15 | ⊙ | ⊙ | ⊙ | ⊙ | ⊙ |
| 16 |  | ⊙ | ⊙ | ⊙ | ⊙ |
| 29 |  | ⊙ | ⊙ | ⊙ | ⊙ |
Fig.3.
Fig.4.
WITNESSES:
R. J. Fitzgerald
J. R. Langley
INVENTOR
John H. Albrecht, and
Walter O. Lum.
BY
Wesley G. Carr
ATTORNEY

UNITED STATES PATENT OFFICE.

JOHN H. ALBRECHT, OF PITTSBURGH, AND WALTER O. LUM, OF WILKINSBURG, PENNSYLVANIA, ASSIGNORS TO WESTINGHOUSE ELECTRIC AND MANUFACTURING COMPANY, A CORPORATION OF PENNSYLVANIA.

MOTOR-CONTROL SYSTEM.

1,330,616.   Specification of Letters Patent.   Patented Feb. 10, 1920.

Application filed May 14, 1915. Serial No. 28,090.

*To all whom it may concern:*

Be it known that we, JOHN H. ALBRECHT, a citizen of the United States, and a resident of Pittsburgh, in the county of Allegheny and State of Pennsylvania, and WALTER O. LUM, a citizen of the United States, and a resident of Wilkinsburg, in the county of Allegheny and State of Pennsylvania, have invented a new and useful Improvement in Motor-Control Systems, of which the following is a specification.

Our invention relates to motor-control systems and particularly to such systems as embody means for controlling electric motors that are brought to rest by means of dynamic braking.

Our invention has for its object to provide a simple means for automatically varying the resistance of a dynamic-braking circuit in accordance with the direction of rotation of the motor.

In the operation of electric motors that are employed in connection with planers or other reversible machine tools in which work is done while the motor rotates in one direction only, different speeds are employed during the actuation of the mechanism in opposite directions. For example, a planer may be operated at 250 to 500 R. P. M. on the cutting stroke and at 500 to 1,000 R. P. M. on the return stroke.

It is desirable to cause the motor to generate a current of approximately the same value for bringing the motor to rest at the end of the cutting stroke as that at the end of the return stroke, although the initial speed of the motor is much higher in the latter case. If the resistance of the dynamic braking circuit is constant and of such an amount that the current traversing the circuit is effective for bringing the motor to rest from a relatively low speed, the current is excessive at higher speeds, and sparking at the commutator and other troubles are caused. If the resistance is adapted for higher speeds, the current is so small as to be ineffective at lower speeds, and too much time is required in bringing the motor to rest.

According to the present invention, we secure a dynamic braking action which is substantially equal for the different motor speeds. The resistance of the dynamic-braking circuit is varied in accordance with the direction of rotation of the motor and, therefore, in accordance with the maximum speeds of the motor in the respective directions. A switch, which controls a shunt circuit for a portion of the dynamic-braking resistor, is automatically controlled by the reversing switches for the motor. By this means, we are enabled to render the dynamic-braking action approximately equal for the different motor speeds employed in the respective directions of operation.

In the accompanying drawings, Figure 1 is a diagrammatic view of circuits and apparatus employed in connection with our invention. Fig. 2 is a diagrammatic view of a schematic arrangement of the system of Fig. 1. Fig. 3 is a diagram indicating the sequence of the controlling switches. Fig. 4 is a view, in elevation, of certain of the switches.

Line conductors 1 and 2, which may be connected to any suitable source of direct current, are connected by a main switch 3 to an electric motor comprising an armature 4, a field winding 5, a series field winding 6 and a shunt field winding 7. The direction of rotation of the motor is controlled by reversing switches 8, 9, 10 and 11. The switches 8 and 10 and 9 and 11 are respectively mechanically connected in pairs for simultaneous operation.

A starting resistor 12, which is connected in series with the motor, is controlled by a switch 13. A resistor 14 is adapted to be connected in series with the motor for dynamic-braking purposes by switches 15 and 16. A shunt circuit for a portion of the resistor 14 is controlled by a switch 17 that is mechanically actuated to its open and closed positions by switches 8 and 9, respectively. The various switches are controlled by a master controller 18, the operating handle of which may be actuated by any suitable moving part of the driven mechanism.

A simplified arrangement of the main and control circuits of the system is shown in Fig. 2. Like reference numerals are employed to designate parts corresponding to those of the system shown in Fig. 1. Fig. 3 is a chart showing the sequence of operation of the various switches as the master switch is moved from one operative position to the other. The vacant squares indicate that the corresponding switches are open and the squares containing a small circle indicate the closed positions of the corresponding switches.

Reference may now be had to Fig. 4, in which are shown the reversing switches and the switch 17 for controlling the shunt circuit for a portion of the resistor 14. The movable member of the switch 17 consists of a bar 19 that is pivoted at approximately its mid-portion and is adapted to be held in the one or the other of its operating positions by means of a spring 20 that is secured to a projecting portion of the bar 19. When the bar is actuated in either direction, the device operates as a snap switch. The bar 19 is actuated to its closed position by the switch 9 and a movable rod 21 and in the opposite direction by the switch 8 and a corresponding rod 21. Since the switches 8 and 9 are not closed simultaneously, the position of the switch 15 is determined by the last pair of the reversing switches to close.

It may be assumed that the main switch 3 has been closed and that a push-button switch 22 has been actuated to close a circuit which extends from the positive line conductor 2 through main switch 3, conductor 23, conductor 24, resistor 25, coil 26, switch 22, conductor 27, and main switch 3 to line conductor 1. The coil 26 is energized by the circuit above traced to close a no-voltage relay 28 which governs the control circuit for the operation of the several switches. The shunt field winding 7 is energized by a circuit that extends from conductor 23, which is connected to line conductor 2, through a switch 29 and field winding 7 to conductor 27, which is connected to the negative line conductor 1. The shunt field winding is thus initially connected directly across the line, and the motor field is of maximum strength at starting.

The handle of the master controller 18 is then actuated to the left from its illustrated, or "off" position, for example, to close switches 30 and 31 and to open a switch 32. A circuit is thus completed which extends from the conductor 23, which is connected to the line conductor 2, through conductor 34, switch 31, actuating coil 35 of the reversing switch 9, switch 30, and no-voltage relay 28, to conductor 27.

The coil 35 is energized to close the reversing switches 9 and 11 to complete a circuit for the motor for operation in the forward direction. This circuit extends from line conductor 2, through main switch 3, series field winding 6, switch 9, commutating field winding 5, armature 4, switch 11, starting resistor 12 and switch 3 to line conductor 1. The motor then rotates in the direction corresponding to the working stroke of the driven mechanism. The torque of the motor is strong because it is operating with a relatively strong field.

When the switch 9 closes, the switch 17 is closed to complete a shunt circuit for a portion of the dynamic-braking resistor 14. A switch 36, which is mechanically connected to the switch 9, is closed, also, to connect the actuating coil 37 of switch 13 across the terminals of the motor armature. When the motor speed is such that its counter electromotive force reaches a predetermined value, the coil 37 is energized to close the switch 13 which completes a shunt circuit for the starting resistor 12.

The switch 29 is opened by the switch 13 to which it is mechanically connected to insert resistance in the circuit of the shunt field winding 7. This circuit extends from conductor 23 through switch 38 of the master switch 18, a portion of a resistor 39 and shunt-field winding 7 to conductor 27. The motor then operates at its normal speed for the working stroke of the driven machine.

When the driven mechanism reaches the end of its working stroke, the controller handle will be actuated to the right by any suitable moving part of the machine to open the switches 30 and 31 and close the switch 32. The circuit of the actuating coil 35 of the reversing switch 9 is broken at the switches 30 and 31, and the switch 9 opens to establish a dynamic-braking circuit for the motor which extends from the armature 4 through the commutating field winding 5, switch 16, series holding coil 41, a portion of the dynamic-braking resistor 14, switch 17, series holding coil 42 of switch 15, and switch 15 to the armature winding 4.

The opening of the switch 9 permits the switch 36, which is mechanically connected to it, to break the circuit of the actuating coil 37 of the switch 13, and the latter opens to remove the shunt circuit for the starting resistor 12. The opening of switch 13 permits the switch 29 to close and thereby connect the shunt field winding 7 directly across the line, the shunt-field resistor 39 being shunted. The motor will then be brought quickly and safely to rest by reason of the dynamic-braking action produced by its operation as a generator.

Further movement of the handle of the master switch operates to close switches 44 and 45 and to open switch 38. A circuit is thus completed which extends from conductor 23 to conductor 34, through switch 45, actuating coil 46 of reversing switch 8, switch 44 and no-voltage relay 28 to conductor 27.

The coil 46 is energized to close the reversing switches 8 and 10 to complete a circuit for the operation of the motor in the direction opposite to that above described. The armature circuit extends from line conductor 2 through main switch 3, series field winding 6, switch 8, armature 4, commutating field winding 5, switch 10, starting resistor 12 and switch 3 to line conductor 1. The motor then rotates in the direction corresponding to the return or idle stroke of the driven mechanism. The shunt field winding 7 is connected directly across the line and the motor operates with a relatively strong field.

The switch 8, in closing, opens the switch 17 which controls a shunt circuit for a portion of the braking resistor 14. A switch 47, which is mechanically connected to the switches 8 and 10, is closed to connect the actuating coil 37 of the switch 13 in shunt to the motor armature. When the counter electromotive force of the motor reaches a predetermined value, the switch 13 is closed to establish a shunt circuit for the starting resistor 12.

The switch 29 is opened by the switch 13 to insert resistance in the circuit of the shunt field winding 7. This circuit extends from conductor 23, switch 32 of the master switch, through a portion of a field resistor 48, field resistor 39, and shunt field winding 7 to conductor 27. Since the amount of resistance inserted in circuit with the shunt field winding 7 is considerably larger than that for operation during the working stroke, the field is correspondingly weakened and the motor rotates at a materially higher rate of speed.

When the machine reaches the end of its return stroke, the reversing switches 8 and 10 are opened in the same manner as that described in connection with switches 9 and 11 to establish the dynamic braking circuit for the motor and to break the circuit of the actuating coil 37 of the switch 13. The opening of the switch 13 operates, as before, to permit the closing of the switch 29 to connect the shunt field winding 7 directly across the line. The dynamic braking effect will be substantially the same as that for bringing the motor to rest when it is operating in the opposite direction. In the latter case, the resistance of the braking circuit is materially increased, but the speed of the motor on the return stroke exceeds that for operation during the working stroke, in a substantially corresponding degree. The current traversing the dynamic-braking circuit is, therefore, substantially the same for operation in the respective directions.

By interlocking the switch which controls a shunt circuit for a portion of the dynamic braking resistor with the reversing switches, the resistance of the dynamic-braking circuit is always arranged in accordance with the direction of rotation of the motor and in accordance with the maximum speeds of the motor in the respective directions. The operation of the system above described is entirely automatic and operates with a high degree of efficiency to bring the motor to rest quickly and safely and to establish connections for its operation in the opposite direction.

It may be noted that, in practice, it is possible to so arrange the resistance of the braking circuit that the current traversing it for bringing the motor to rest at the end of the cutting stroke is heavier than the current at the end of the return stroke because of the relatively lower initial speeds of the motor in the former case. This arrangement is entirely practical because, as is well known, a heavier current may be commutated by a dynamo-electric machine operating at low speeds than when operating at relatively high speeds, other conditions being equal.

We claim as our invention:

1. In a motor-control system, the combination with an electric motor, and a dynamic-braking circuit therefor, of means for varying the resistance of said circuit in accordance with the direction of rotation of said motor, said means comprising a pair of reversing switches, a resistor and a switch for controlling a shunt circuit for said resistor mechanically actuated by said reversing switches.

2. In a motor-control system, the combination with an electric motor, and reversing mechanism therefor, of a dynamic-braking circuit for said motor, said circuit comprising a resistor, and means controlled by said reversing mechanism for controlling said resistor, said means comprising a switch biased to the one or the other of two positions according as it is actuated to the respective sides of a central position and mechanical means for operatively connecting said switch to said reversing mechanism.

3. In a motor-control system, the combination with an electric motor, and reversing mechanism therefor, of a dynamic-braking circuit for said motor comprising a resistor, and means mechanically actuated by said reversing mechanism for varying the effective portion of said resistor in accordance with the direction of rotation of said motor.

4. In a motor-control system, the combination with an electric motor, and reversing mechanism therefor, of a dynamic-braking circuit for said motor comprising a resistor, and a switch mechanically actuated by said reversing mechanism for shunting a portion of said resistor whenever the reversing mechanism is adjusted for operation of said motor in one direction.

5. In a motor-control system, the combination with an electric motor, and reversing mechanism therefor, of a dynamic-braking circuit for said motor comprising a resistor, and a switch mechanically actuated by said reversing mechanism for shunting a portion of said resistor.

6. In a motor control system, the combination with an electric motor and a plurality of switches for controlling the direction of rotation of said motor, of a dynamic-braking circuit for said motor, and a switch for controlling said dynamic circuit that is opened by one of said switches and closed by another of said switches.

7. In a motor-control system, the combination with an electric motor, and a plurality of pairs of reversing switches therefor, of a dynamic braking circuit for said motor, a switch for controlling said circuit so arranged that it is mechanically actuated in one direction by one pair of reversing switches and in the opposite direction by another pair of reversing switches.

In testimony whereof, we have hereunto subscribed our names this 30th day of April, 1915.

J. H. ALBRECHT.
WALTER O. LUM.